United States Patent
Vedula (10) Patent No.: US 7,610,293 B2
(45) Date of Patent: Oct. 27, 2009

(54) CORRELATION OF RESOURCE USAGE IN A DATABASE TIER TO SOFTWARE INSTRUCTIONS EXECUTING IN OTHER TIERS OF A MULTI TIER APPLICATION

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 11/566,240

(22) Filed: Dec. 4, 2006

(65) Prior Publication Data

US 2008/0091644 A1    Apr. 17, 2008

(30) Foreign Application Priority Data

Oct. 11, 2006    (IN) ........................ 1882/CHE/2006

(51) Int. Cl.
    *G06F 7/00* (2006.01)
(52) U.S. Cl. ........................ 707/100; 707/104.1; 714/39
(58) Field of Classification Search ................. 707/100, 707/104.1; 714/39
    See application file for complete search history.

(56) References Cited

U.S. PATENT DOCUMENTS

| 7,028,301 | B2 * | 4/2006 | Ding et al. .................. 718/104 |
| 7,051,095 | B1 * | 5/2006 | Cantwell .................... 709/223 |
| 7,194,664 | B1 * | 3/2007 | Fung et al. .................... 714/45 |
| 7,379,994 | B2 * | 5/2008 | Collazo ....................... 709/224 |
| 2002/0152305 | A1 * | 10/2002 | Jackson et al. .............. 709/224 |
| 2002/0194251 | A1 * | 12/2002 | Richter et al. ............... 709/105 |
| 2003/0009507 | A1 * | 1/2003 | Shum ........................ 709/104 |
| 2003/0236745 | A1 * | 12/2003 | Hartsell et al. ................ 705/40 |
| 2004/0216113 | A1 * | 10/2004 | Armstrong et al. .......... 718/104 |
| 2004/0261081 | A1 * | 12/2004 | Sen ............................ 719/313 |
| 2005/0038833 | A1 * | 2/2005 | Colrain et al. .............. 707/203 |
| 2005/0055590 | A1 * | 3/2005 | Farkas et al. ................ 713/320 |
| 2005/0144025 | A1 * | 6/2005 | Katz et al. ..................... 705/1 |
| 2005/0288960 | A1 * | 12/2005 | Sharp ........................... 705/1 |
| 2006/0069786 | A1 * | 3/2006 | Mogul et al. ................ 709/229 |
| 2006/0274722 | A1 * | 12/2006 | Polan et al. ................. 370/352 |
| 2007/0011330 | A1 * | 1/2007 | Dinker et al. ............... 709/226 |

OTHER PUBLICATIONS

PerformaSure® J2EE Application Performance Diagnostics, pp. 1-3, 2006, Quest Software, Inc., Downloaded Circa: Aug. 2006.

Quest's Application Assurance Suite for Java and Portals Becomes an Integral Part of a Leading E-Business Solution Provider's Infrastructure and Qualification Process, pp. 1-2, 2006, Quest Software, Inc., Downloaded Circa: Aug. 2006.

(Continued)

*Primary Examiner*—Charles Rones
*Assistant Examiner*—Phuong-Thao Cao
(74) *Attorney, Agent, or Firm*—Narendra Reddy Thappeta (57) ABSTRACT

Correlating resource usage in a database tier to software instructions executing in other tiers of a multi tier application. In an embodiment, each block of instructions of interest (executing in different tiers) is designed to add a corresponding tag associated with a request (requiring a database operation to be performed). The resources required for performance of the database operation may be measured and the tags may be stored along with the measured resources, thereby facilitating correlation of desired software instruction blocks with the usage of resources in database tier.

18 Claims, 8 Drawing Sheets

OTHER PUBLICATIONS

Quest Software's J2EE Health Check Proves Diagnostic Prowess at Blue Agave, pp. 1-2, 2006, Quest Software, Inc., Downloaded Circa: Aug. 2006.

PerformaSure® J2EE Application Performance Assurance, pp. 1-2, 2006, Quest Software, Inc., Downloaded Circa: Aug. 2006.

* cited by examiner

```
410: Function ComputeAndPreviewOrder (Items SelectedItems)
411: {
412:    QueryContext qctx = CreateEmptyQueryContext();
413:    Prices plist;
414:    Discounts dlist;

415:    qctx.addTag("BeginOrder");
416:    For each of item in SelectedItems
417:        qctx.addTag("SelectItem");
418:        Boolean available= CheckInventory (item);
419:        If available
420:            qctx.addTag("GetPrice");
421:            Price p = GetPrice(item);
422:            plist.add(p);
423:            qctx.addTag("GetDiscount");
424:            Discount d = GetDiscount(item);
425:            dlist.add(d);
426:        End If
427:    End For 428:    qctx.addTag("ComputeTotal");
429:    Price total = ComputeTotalCost(plist,dlist);
430:    return new Details(total);
431: }
```

*FIG. 4A*

```
450: Function CreateOrder(Items selectedItems, Details d)
451: {
452:     QueryContext qctx = QueryContext.getCurrentQueryContext();
453:     Price total = d.getTotalCost();
454:     Location location = d.getShipToLocation();

455:     qctx.addTag("CreateOrder");
456:     int orderid = createuniqueOrderID();
457:     int userid = getCurrentUserID();

458:     Query qq = new Query("insert into ORDER_TABLE values (orderid, userid, item1,item2, total, location)");
459:     Driver.ExecuteQuery(qq, qctx);
460: }
```

FIG. 4B

```
470: Function ExecuteQuery(Query qq, QueryContext qctx)
471: {
472:     If PLAN table available
473:         RunExplainPlan (qq, qctx.getTags());
474:         RunQueryInternal(qq);
475:     Else
476:         String s = qctx.getTagAsComment() + qq.getSQL();
477:         Query q = new Query(s);
478:         RunQuery(q);
479:     End If
480: }
```

FIG. 4C

| ADDRESS | HASH_VALUE | PIECE | SQL_TEXT |
|---|---|---|---|
| Ab7125PP | Byq95Ij6j | 0 | Select /** first rows*/ /** BeginOrder-SelectItem-GetPrice*/ from price_table |
| 2262sdghs7 | A26723adgfa | 0 | Select /** first rows*/ /** BeginOrder-SelectItem-GetPrice-GetDiscount*/ from Discounts_table |
| Ad6237sh | 623725ccsghs | 0 | /** BeginOrder-SelectItem-GetPrice-GetDiscount-ComputeTotal-CreateOrder*/ insert into ORDER_TABLE values (orderid, userid, item1, item2, total, location) |

FIG. 5A

| ADDRESS | HASH_VALUE | EXECUTIONS | BUFFER_GETS | DISK_READS |
|---|---|---|---|---|
| Ab7125PP | Byq95Ij6j | 3 | 25 | 10 |
| 2262sdghs7 | A26723adgfa | 3 | 22 | 5 |
| Ad6237sh | 623725ccsghs | 1 | 1 | 4 |

FIG. 5B

| STATEMENTID | TIMESTAMP | CPU_COST | BYTES | IO_COST |
|---|---|---|---|---|
| BeginOrder-SelectItem-GetPrice | 16 Sept 2006 15:30:03:45 | 40 | 2626 | 30 |
| BeginOrder-SelectItem-GetPrice-GetDiscount | 16 Sept 2006 15:30:03:57 | 30 | 800 | 10 |
| BeginOrder-SelectItem-GetPrice-GetDiscount-ComputeTotal-CreateOrder | 16 Sept 2006 15:30:04:22 | 30 | 10 | 50 |

CORRELATION OF RESOURCE USAGE IN A DATABASE TIER TO SOFTWARE INSTRUCTIONS EXECUTING IN OTHER TIERS OF A MULTI TIER APPLICATION

RELATED APPLICATIONS

The present application is related to and claims priority from the co-pending India Patent Application entitled, "Correlation of Resource Usage in a Database Tier to Software Instructions Executing in Other Tiers of a Multi Tier Application", Serial Number: 1882/CHE/2006, Filed: Oct. 11, 2006, naming the same inventors as in the subject patent application.

BACKGROUND OF THE INVENTION

1. Field of the Invention

The present disclosure relates to server technologies and more specifically to a method and apparatus for correlation of resource usage in a database tier to software instructions executing in other tiers of a multi tier application.

2. Related Art

Applications generally are divided into multiple tiers, with each tier providing a disparate and specific utility with appropriate interfaces for interfacing with other tiers. Different tiers in a multi tier application may be located on the same machine or on different machines connected through a network. An example of a multi tier application is a three-tier application in which a presentation tier provides user interfaces, a business logic tier implements the general computational aspects and a database tier provides a persistent storage for data.

It is often required to correlate the usage of resources (e.g., processor time, memory usage, number of accesses to persistent storage) in a database tier to specific software instructions executing in other tiers. For example, an administrator may wish to know the specific software modules that were executed to cause the usage of resources in processing each database operation such as a select query or a insert command in a database. By recognizing the (execution of) specific module, which caused the usage of resources, an administrator may be able to perform various management tasks such as load balancing across multiple servers, prioritization of resources to process the commands, etc.

One challenge with such correlation of usage of resources is each tier may potentially be executing on a different system (hardware unit) or across multiple systems, potentially implemented by different vendors. Due to such constraints, it may be challenging to determine the specific software instructions causing usage of specific resources in a database tier.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

In an embodiment, each block of instructions of interest (executing in various tiers of a multi tier application) is designed to associate a corresponding tag with the processing of a request requiring a database operation to be performed in a database tier. The resources required to perform the database operation are measured and the measured resources along with the tags are stored in the database tier, thereby enabling the correlation of the execution of blocks of instructions of interest with the resource usage in the database tier.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
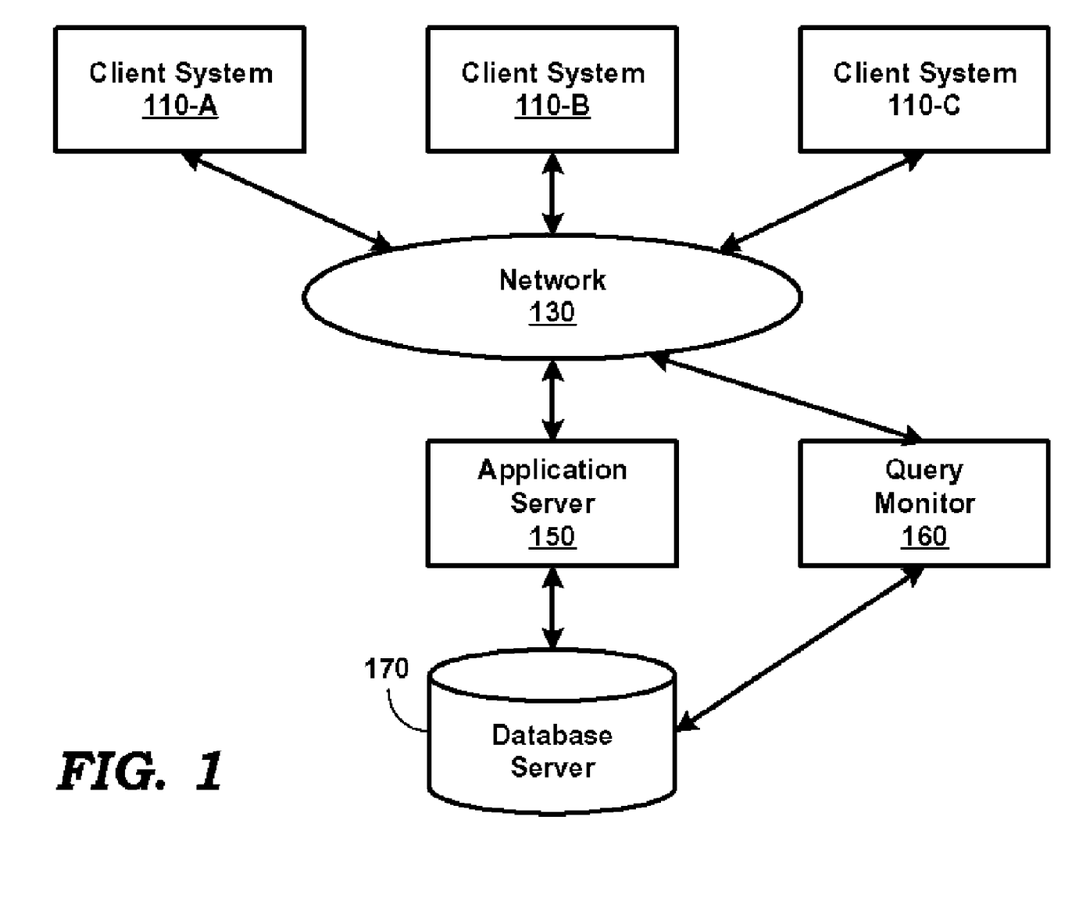
FIG. 1 is a block diagram illustrating an example environment in which various aspects of the present invention can be implemented.

FIG. 1 is a block diagram illustrating an example environment in which various aspects of the present invention can be implemented. The block diagram is shown containing client systems 110A-110C, network 130, application server 150, query monitor 160 and database server 170. Merely for illustration, only representative number/type of systems is shown in the Figure. Many environments often contain many more systems, both in number and type, depending on the purpose for which the environment is designed. Each system/device of FIG. 1 is described below in further detail.

Network 130 provides connectivity between various client systems 110A-110C, application server 150 and query monitor 160. Network 130 may be implemented using protocols such as Internet Protocol (IP) well known in the relevant arts. Database server 170 facilitates storage and retrieval of data using structured queries such as SQL in the case of relational database technologies.

Each of client systems 110A-110C represents a system such as a personal computer, workstation, mobile station, etc., and is used by a user to generate requests to application server 150 (for performing various operations). The requests may be generated according to a suitable user interface. Query monitor 160 enables administrators (using one of client systems 110A-110C) to retrieve correlation information from database server 170. The retrieved information (generated according to several aspects of the present invention and described below) may correlate the usage of resources in database server 170 to the various software modules, which caused the execution of the database operation causing the usage of resources.

Application server 150 facilitates execution of various tiers of multi tier applications, which causes issuance of commands to execute various database operations in a database tier implemented in database server 170. Though shown as a single unit, application server 150 may contain different physical systems each executing different tiers of the multi tier application.

Client system 110A, application server 150, and database server 170 together implement applications in multiple tiers, and various aspects of the present invention enable correlation of resource usage in a database tier to software instructions executing in the other tiers. Accordingly, the description is continued illustrating the various tiers in an embodiment.

3. Multi Tier Application

Figure 2:
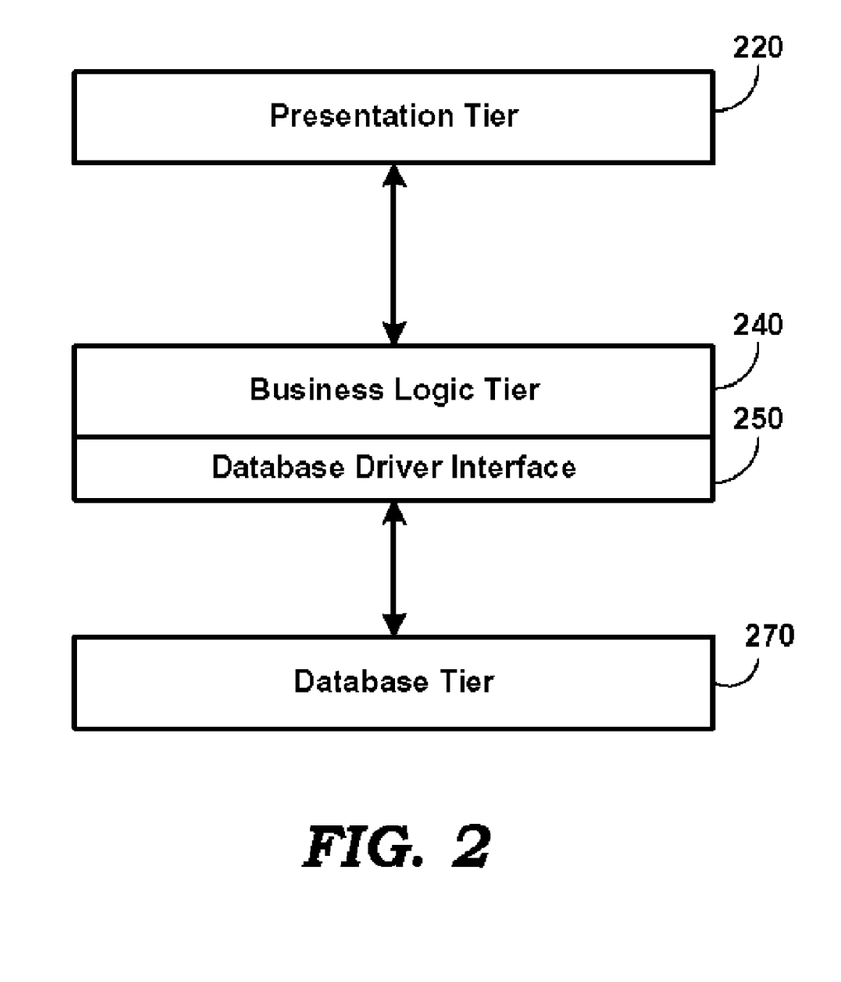
FIG. 2 is a block diagram illustrating the various tiers of a multi tier application in one embodiment.

FIG. 2 is a block diagram illustrating the various tiers of a multi tier application in which various aspects of the present invention can be implemented. The block diagram is shown containing presentation tier 220, business logic tier 240, database driver interface 250, and database tier 270. Merely for illustration, only representative number/type of tiers is shown in the Figure. Many applications often contain many more tiers, both in number and type. Each block of FIG. 2 is described below in further detail.

Presentation tier 220 contains various user interfaces (displayed in client systems 110A-110C) used for communicating with users. Presentation tier 220 may receive user specified information and translate the information into data required by other tiers for performing various user specified operations. On receiving data from the various tiers (such as business logic tier 240) as a result of performing the various operations, presentation tier 220 translates and displays the data in a manner understandable to the user according to pre-specified logic.

Business logic tier 240 receives from presentation tier 220 the user specified operations and data for the operations, and performs various computations according to a program logic. While performing specified operations, business logic tier 240 may also store and/or retrieve data (by specifying database operations) from database tier 270 using database driver interface 250.

Database driver interface 250 provides the interface to communicate with database tier 270 and is designed consistent with the implementation of database server 170. Database driver interface 250 may be implemented using JDBC or ODBC compliant architectures depending on the specific implementation of the database server.

Database tier 270 receives database operations to be performed from business logic tier 240 and executes the database operations. Results of the database operations may be sent back to business logic tier 240.

It may be appreciated that presentation tier 220 and business logic tier 240 are implemented in application server 150 and database tier 270 is implemented in database server 170 in one embodiment. Due to such implementation of different tiers in different systems, it may be desirable to enable an administrator to correlate the usage of resources in a database server with the specific software instructions executed in other tiers. The manner, in which such a feature can be provided, is described below in further detail.

4. Generating and Storing Correlation Information

Figure 3:
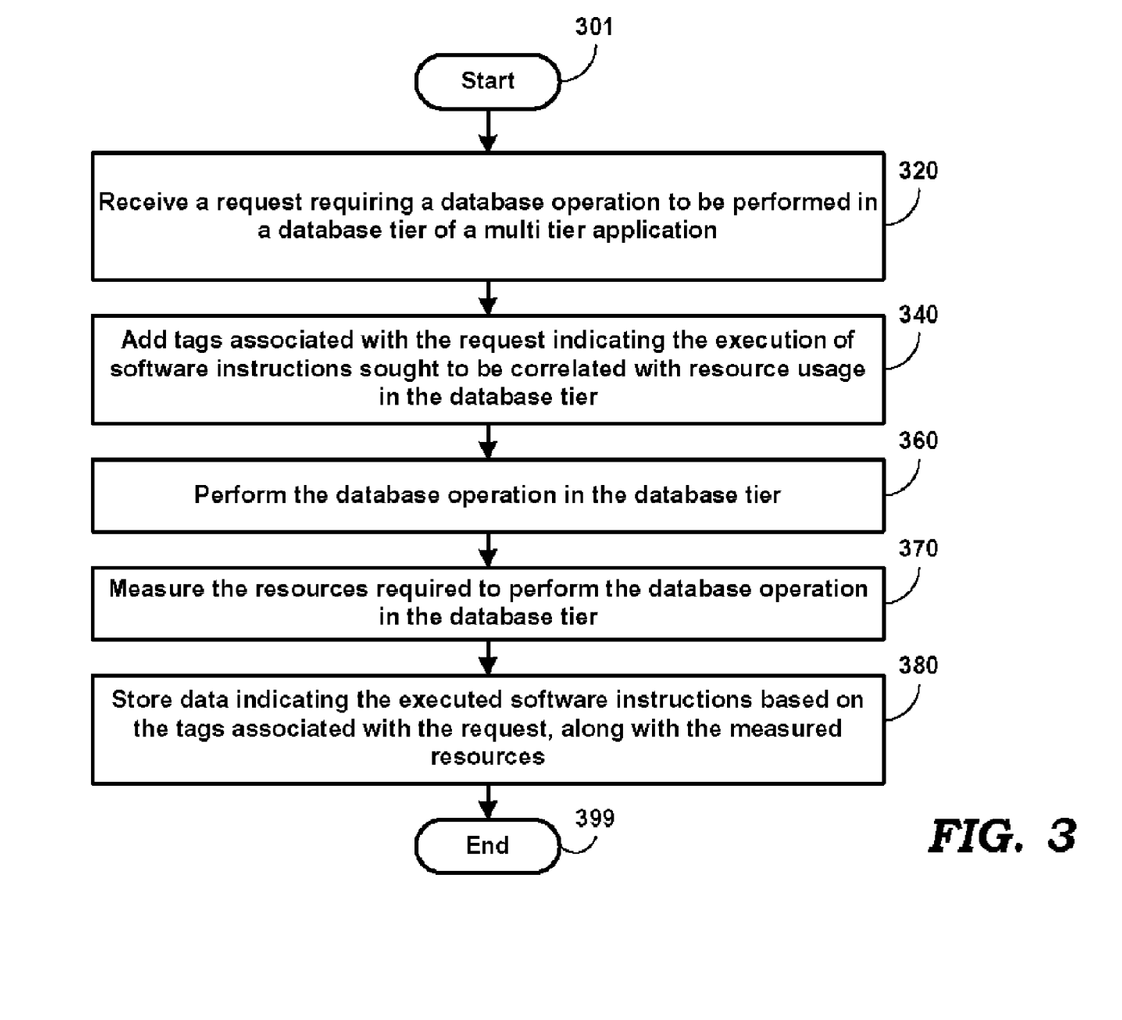
FIG. 3 is a flowchart illustrating the manner in which correlation information correlating the usage of resources in a database to software instructions executed in various tiers of a multi tier application is generated and stored in an embodiment of the present invention.

FIG. 3 is a flowchart illustrating the manner in which correlation information correlating the usage of resources in a database to software instructions executed in various tiers of a multi tier application is generated and stored in an embodiment of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein. The flow chart begins in step 301, in which control immediately passes to step 320.

In step 320, a request requiring a database operation to be performed in a database tier of a multi tier application is received. Though described as being received in application server 150 in the embodiments described below, the request may be received in/by any other system (or tier) executing software instruction blocks, which need to be correlated with the usage of resources in the database tier when performing the required database operation.

In step 340, tags are added associated with the request indicating the execution of software instructions sought to be correlated with resource usage in the database tier. Each tag may uniquely identify the corresponding block of software instructions. Various techniques may be employed to add the tags associated with the request depending on the environment in which the features of the invention are implemented, as will be apparent to one skilled in the relevant arts by reading the disclosure provided here.

In step 360, the database operation is performed in the database tier. In step 370, the resources required to perform the database operation in the database tier are measured. Depending on the features provided by the environment and/or accuracy desired, the resource requirements may either be estimated (potentially before the performance of the database operation) or determined by examining the various counters, etc., provided in the environment.

In step 380, data is stored indicating the executed software instructions based on the tags associated with the request, along with the measured resources. By choosing the tags to identify the blocks of software instructions of interest, the tags added in step 340 them selves may be stored. Alternatively, the tags may be translated into more meaningful strings and then stored, as suited in the specific environment. The flow chart ends in step 399.

It may be appreciated that the correlation information (containing data indicating the executed software instructions and the measured resources) stored in a database tier may be retrieved by administrators (using query monitor 160) and used for correlating resource usage in a database tier to software instructions executing in other tiers of a multi tier application. The generation and storage of correlation information can be implemented in various ways using a desired combination of hardware, software and firmware. In an embodiment, the features are implemented as software instructions, as described below in further detail.

5. Implementation

FIGS. 4A, 4B, 4C, 5A, 5B and 6 together illustrate the manner in which correlation information is generated and stored in example embodiments. The embodiments are illustrated assuming that an example request from a user to preview an order for a selected list of items is received by application server 150, and the total cost of the order is calculated and sent to the user. In addition, upon receiving a confirmation from the user, the order details (such as total cost, location where the order is to be shipped) for the user are inserted in database server 170.

It is further assumed that it is desirable to correlate usage of resources in database server 170 with the execution of some of the modules in business logic tier 240, and accordingly the description is continued with respect to the program logic of the modules, in addition to the additional changes implemented therein for the desired correlation, as described below with respect to FIGS. 4A and 4B. It should be appreciated that the details of implementation of some of the methods are not provided as being apparent to one skilled in the relevant arts by reading the disclosure provided herein.

Figure 4A:
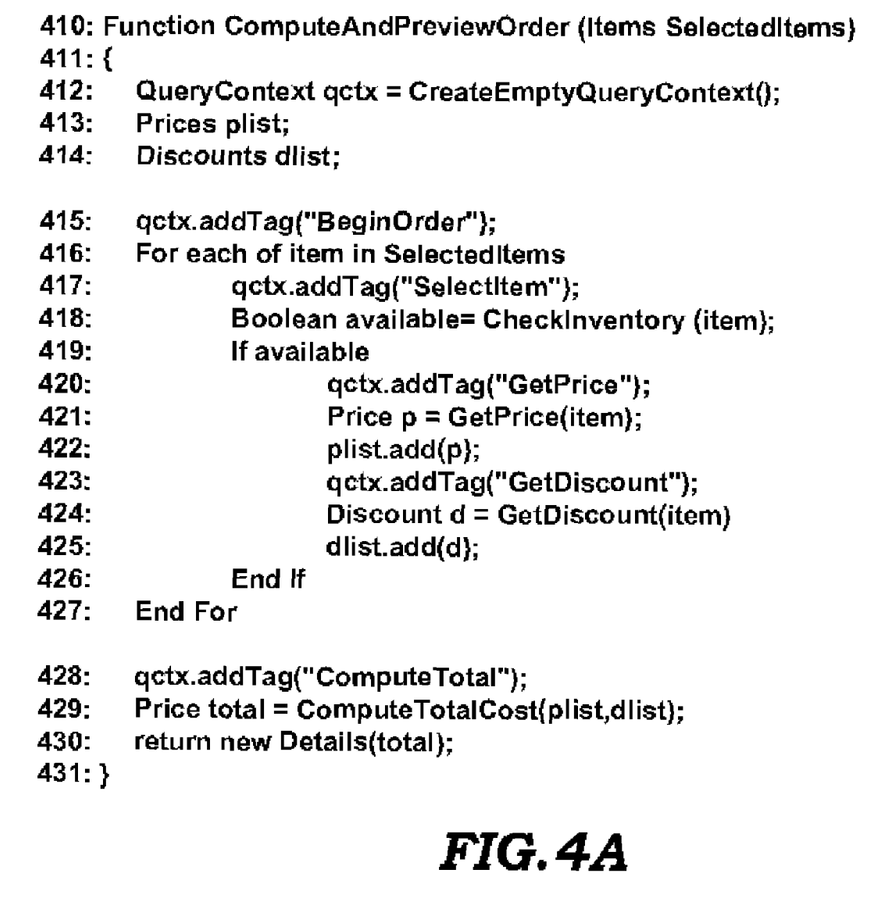
FIG. 4A depicts software instructions in a portion of a software module executed on receiving a request for previewing an order for a selected list of items in an embodiment.

FIG. 4A depicts a portion of a software module executed (in business logic tier 240) on receiving a request for previewing an order for a selected list of items in an embodiment. The request may be specified from a web page displayed to the user. Presentation tier 220 on receiving the request identifies the software module to be executed and forwards the data (with/without translation) in the request to the identified software module.

Lines 410-431 specify a function "ComputeAndPreviewOrder" that may be executed when a request for previewing an order for selected items is received. In line 412, variable "qctx" is initialized with an empty query context, which is to be used for associating various tags with the database operation.

In line 415, a tag "BeginOrder" is added to the query context, assuming that it is desirable to correlate the resource usage in database server 170 to execution of function starting at line 410 (or the set of instructions in lines 416-431 which would necessarily be executed upon execution of the function under normal execution). It may be appreciated that though the tags are depicted as simple strings, more complex strings (containing the date/time, the thread id, the connection id, etc) may be used.

Similarly, in lines 417, 420 and 423, tags "Selectitem", "GetPrice" and "ComputeTotal" are added to the query context. In general, a software developer may incorporate a corresponding tag at each point of execution of interest. Thus, the tags added at lines 415, 417, 420 and 423 respectively indicate that the instructions corresponding to selecting item, getting the price of the selected item, getting the discount of the selected item and computing the total cost of the order, are executed.

In lines 416-427, each of the selected items is checked for availability (in line 418) and if the selected item is available, the price and discount for the available item is retrieved (in lines 421 and 424 respectively) and added to corresponding lists ("plist" for price and "dlist" for discounts).

In line 421, the function "GetPrice(item)" may perform a database operation to retrieve the price of the item from database tier 270. For example, the database operation may be specified as a query in SQL ("Select price from price table where item_id=1001"). In such a scenario, the tags ("BeginOrder", "Selectitem", "GetPrice") in the query context may be stored along with the SQL query as described below with respect to FIG. 5A.

Similarly, in line 424, upon execution of function "GetDiscount (item)", the previous tags along with the tag "GetDiscount" may be stored along with the database operation. In line 429, the total cost of the order is calculated using the price list "plist" and the discount list "dlist" of the selected items and is returned as the response.

Figure 4B:
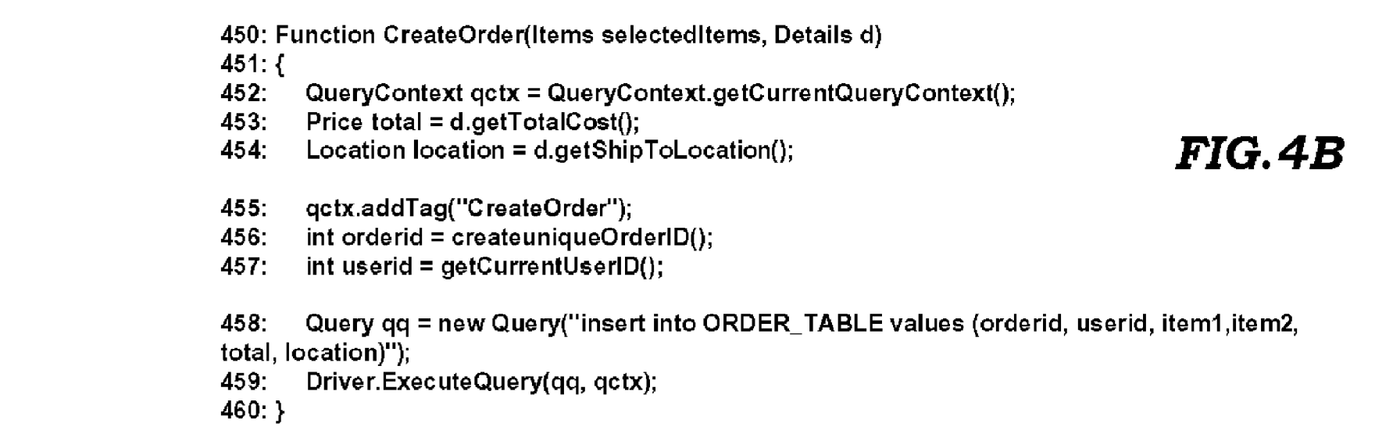
FIG. 4B depicts the instructions in a portion of a software module executed on receiving confirmation of a previewed order for a selected list of items in an embodiment.

FIG. 4B depicts a portion of a software module executed (in business logic tier 240) on receiving confirmation of a previewed order for a selected list of items in an embodiment. Lines 450-460 specify a function "CreateOrder" that may be executed when a request confirming an order for selected items is received. In line 452, variable "qctx" is initialized with the current query context that contains the tags that have already been added by execution of software modules in other tiers (it will be obvious to a skilled practitioner to implement the method "getCurrentQueryContext"). The current query context is passed associated with the request (or a session associated with the current user) from one tier to the other. It may be appreciated that the function "CreateOrder" may be executed in a different physical system, since the process of ordering typically requires an authenticated server in comparison to previewing an order.

In lines 453-454, variables "total" and "location" are initialized with the values of total cost and the location where the order is to be sent. In line 455, a tag "CreateOrder" is added to the query context. In lines 456 and 457, variables "orderid" and "userid" are initialized with a uniquely generated order identifier and the identifier of the current user respectively. In line 458, a query (representing a database operation) is generated in SQL containing the values of order identifier, identifier of the current user, selected items, total cost and the location where the order is to be sent. In line 459, the query is executed by passing the query along with the tags from business logic tier 240 to database driver interface 250 "Driver" (where the function "ExecuteQuery" is implemented).

Figure 4C:
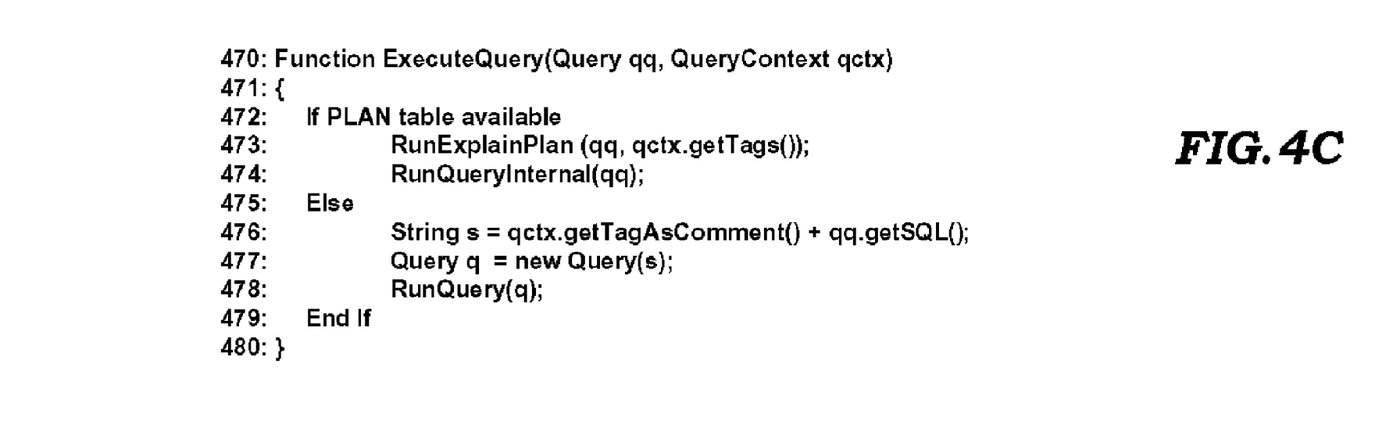
FIG. 4C depicts the instructions in a portion of a software module that performs database operations in an embodiment.

FIG. 4C depicts a portion of a software module (executing in database driver interface 250) that performs database operations in an embodiment. Lines 470-480 specify a function "ExecuteQuery" that may be executed when a database operation is to be performed. The function receives the query "qq" specifying the database operation that is to be performed and the query context "qctx" that contains the tags generated by the various tiers in the multi tier application.

In line 472, the existence of a "PLAN" table is determined. In the scenario where a "PLAN" table exists (e.g., in Oracle 8i database from Oracle Corporation, the assignee of the subject application, and described in further detail in a book entitled "Advanced Oracle Tuning and Administration" by Kevin Loney, Noorali Sonawalla, Eyal Aronoff with ISBN 0078822416), lines 473-474 are executed and lines 476-478 are executed otherwise. The first parameter of RunExplainPlan method of line 473 represents a query and the second parameter is a string. The method, when executed, estimates the resources required for executing the database operation represented by the query and stores in a PLAN table the string along with the estimated resources (as described below with respect to FIG. 6). Then, in line 474, the database operation is performed by executing the query represented by the variable "qq".

Alternatively in lines 476-478, the database operation is performed by first concatenating the query with a string containing the tags and then executing the concatenated query. As is common with several commercially available databases (e.g., Oracle 8i database from Oracle Corporation), execution of the query including such a concatenated string, causes the database server to execute the query, in addition to storing the resources required (for executing query) along with the query string, as depicted in FIGS. 5A and 5B.

Thus, correlation information containing tags generated by the various tiers of a multi tier application and measured resources of the performance of database operations in a database tier are generated and stored. Administrators may use the stored information (using query monitor 160) to monitor multi tier applications executing in application server 150. The description is continued describing the manner in which correlation information is stored in an embodiment.

Figure 5A:
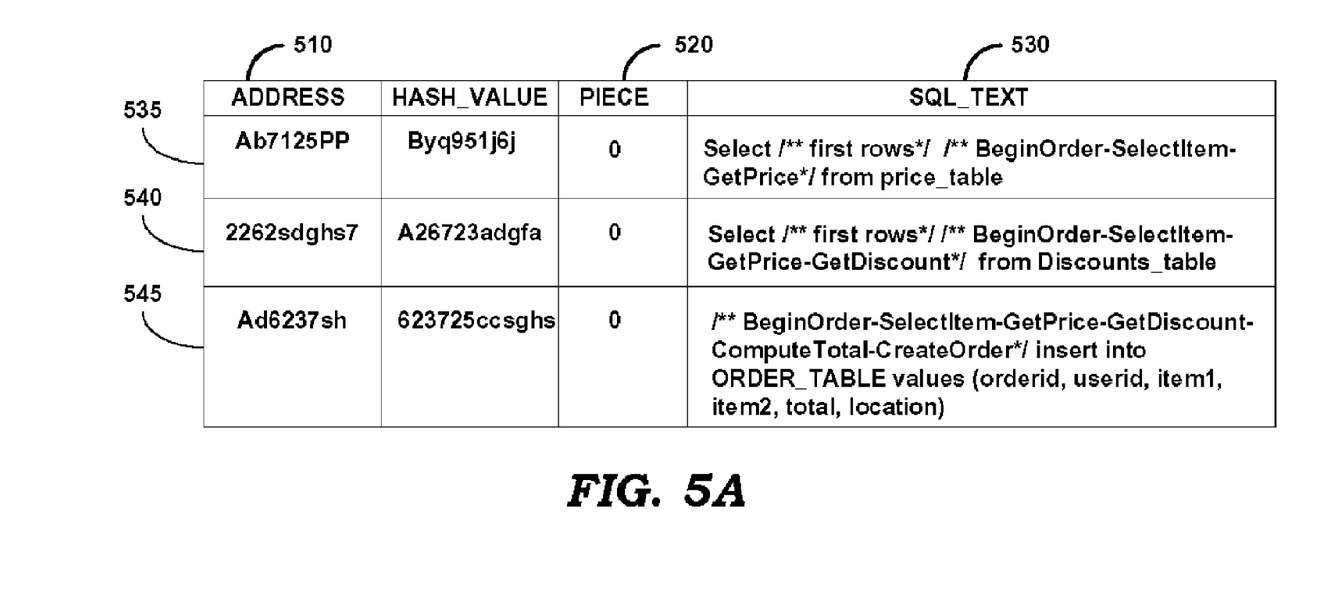
FIGS. 5A and 5B together depict the correlation information stored in a memory in one embodiment.
Figure 5B:
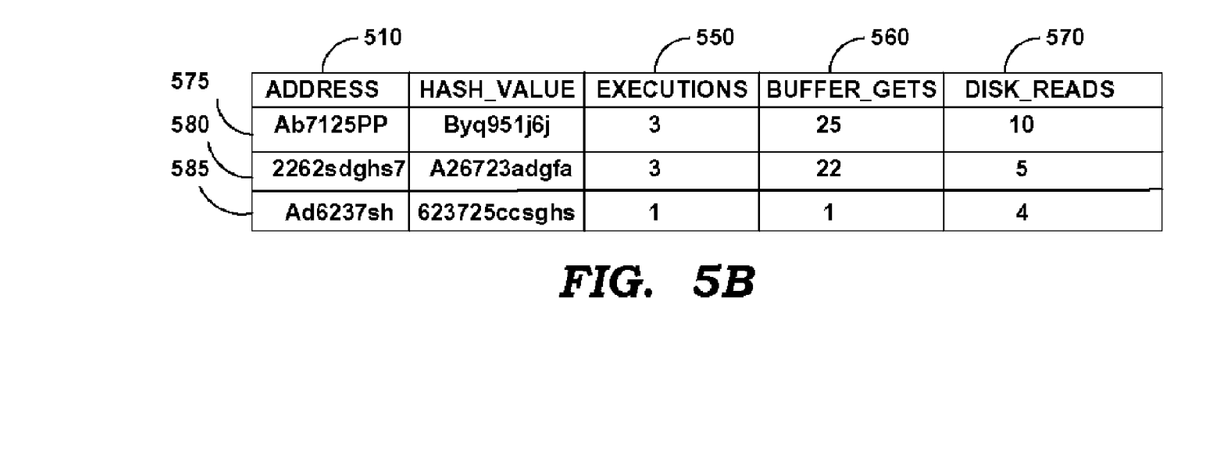

FIGS. 5A and 5B together depict the correlation information stored (due to execution of lines 476-478) in an embodiment. The information is depicted as being stored in tables in database server 170 implemented using Oracle 8i database from Oracle Corporation. Each table is described below in further detail.

With respect to FIG. 5A, column 510 (labeled "ADDRESS") identifies uniquely database operations that have been performed by database tier 270 (implemented in database server 170). Column 520 (labeled "PIECE") indicates whether the database operations are specified completely (value 0, as shown) or in part. Column 530 (labeled "SQL_TEXT") specifies the database operations that have been performed by database tier 170. The database operation is specified using structured query language (SQL) well known in relevant arts.

Row 535 specifies a database operation for retrieving the price details of a selected item (when line 421 was executed). Column 530 of row 535 specifies the operation "Select price /\*\*BeginOrder-Selectitem-GetPrice\*/ from price table where item_id=1001" containing the string "/\*\*BeginOrder-Selectitem-GetPrice\*/" which indicates the various tags ("BeginOrder", "Selectitem" and "GetPrice") associated with the operation. Similarly, row 540 specifies a database operation for retrieving the discount details of a selected item (when line 424 was executed).

Row 545 specifies a database operation for insertion of order details for the user. Column 530 of row 545 specifies the operation "/\*\* BeginOrder-Selectitem-GetPrice-GetDiscount-ComputeTotal-CreateOrder\*/ insert into ORDER TABLE values (orderid, userid, item1, item2, total, location)" containing the string "/\*\* BeginOrder-Selectitem-GetPrice-GetDiscount-ComputeTotal-CreateOrder\*/" which indicates the various tags (such as "ComputeTotal" and "CreateOrder"). It may be observed that the tags "ComputeTotal" and "CreateOrder" are not present in the previous database operations, thus indicating the software instructions that where executed after the database operation of rows 535 and 540 (typically in multiple tiers).

With respect to FIG. 5B, columns 550 (labeled "EXECUTIONS"), 560 (labeled "BUFFER_GETS") and 570 (labeled "DISK_READS") indicate various resources measured while performing various database operations. Rows 575, 580 and 585 specify the details of performing database operations corresponding to rows 535, 540 and 545 respectively (due to the same value for ADDRESS column 510). In row 575 (corresponding to database operation of row 535), column 550 "3" indicates the number of times the database operation has been performed, column 560 "25" indicates the number of times the buffer (memory) was accessed during the performance of the database operation and column 570 "10" indicates the number of times the hard disk was accessed during the performance of the database operation.

Thus, the correlation information (data indicating the executed software instructions based on the tags and the details of the various resources measured) is stored along with the database operation. An administrator may use the following instructions (by sending them to query monitor 160) to identify the software instructions that are executing for a long period of time:

```
Select SQL_TEXT
from V$SQLSTATS A, V$SQLTEXT B
where DISK_READS > 30 and A.ADDRESS = B.ADDRESS;
```

In this instruction "V$SQLTEXT" refers to a table containing data as depicted in FIG. 5A and "V$SQLSTATS" refers to a table containing data as depicted in FIG. 5B. The "SQL_TEXT" received as the result of performing the above instructions contains the tags indicating the executed software instructions. Thus, the administrator may identify the software instructions (modules) that have been executing for a long period of time.

Figure 6:
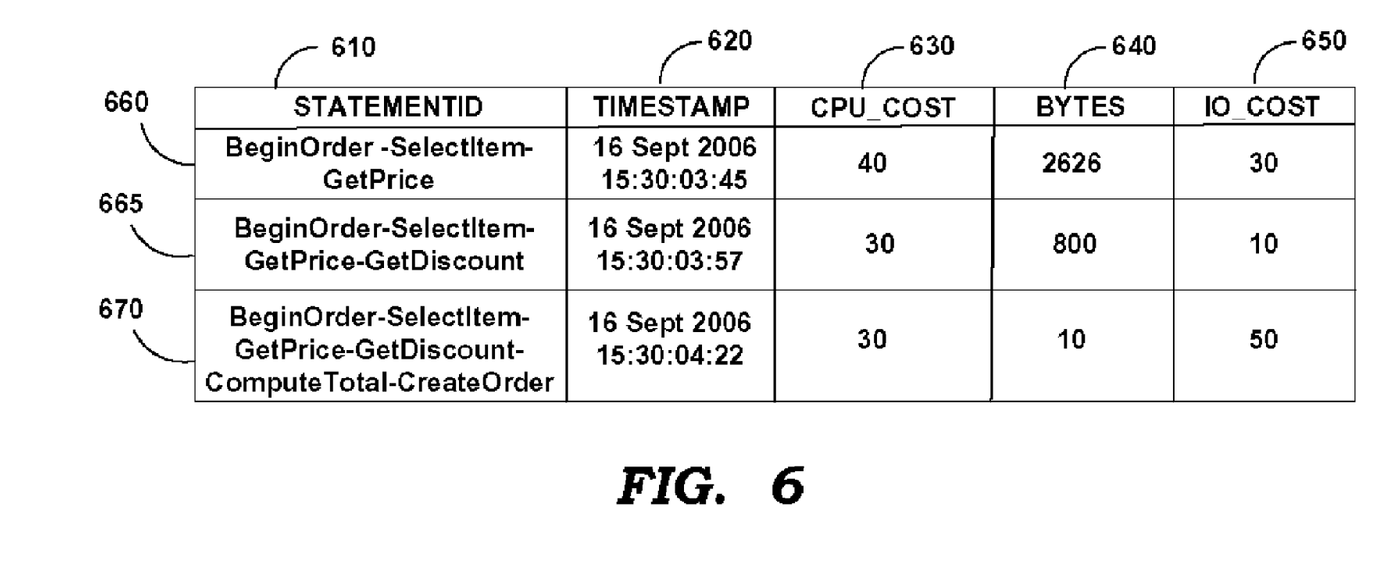
FIG. 6 depicts a table containing the correlation information stored in an alternative embodiment.

The description is continued with FIG. 6 depicting a table containing the correlation information stored in an alternative embodiment (when lines 473-474 are executed). Each of the columns and rows of the table are described below in further detail.

Column 610 (labeled "STATEMENTID") specifies the tags (generated from executing software instructions in the various tiers) associated with the execution of database operations performed by database tier 270 (implemented in database server 170). Columns 620 (labeled "TIMESTAMP"), 630 (labeled "CPU_COST"), 640 (labeled "BYTES") and 650 (labeled "IO_COST") indicate various resources measured during performing the database operations. Rows 660, 665 and 670 specify the correlation information corresponding to performing various database operations when lines 421, 424 and 458 where executed respectively and correspond to rows 535, 540 and 545 respectively. It may be appreciated that in this embodiment, the SQL query is not stored in the table.

It should further be appreciated that application server 150 may be implemented in a combination of one or more of hardware, software and firmware. The description is continued with respect to an embodiment in which various features are operative by execution of corresponding software instructions.

6. Digital Processing System

Figure 7:
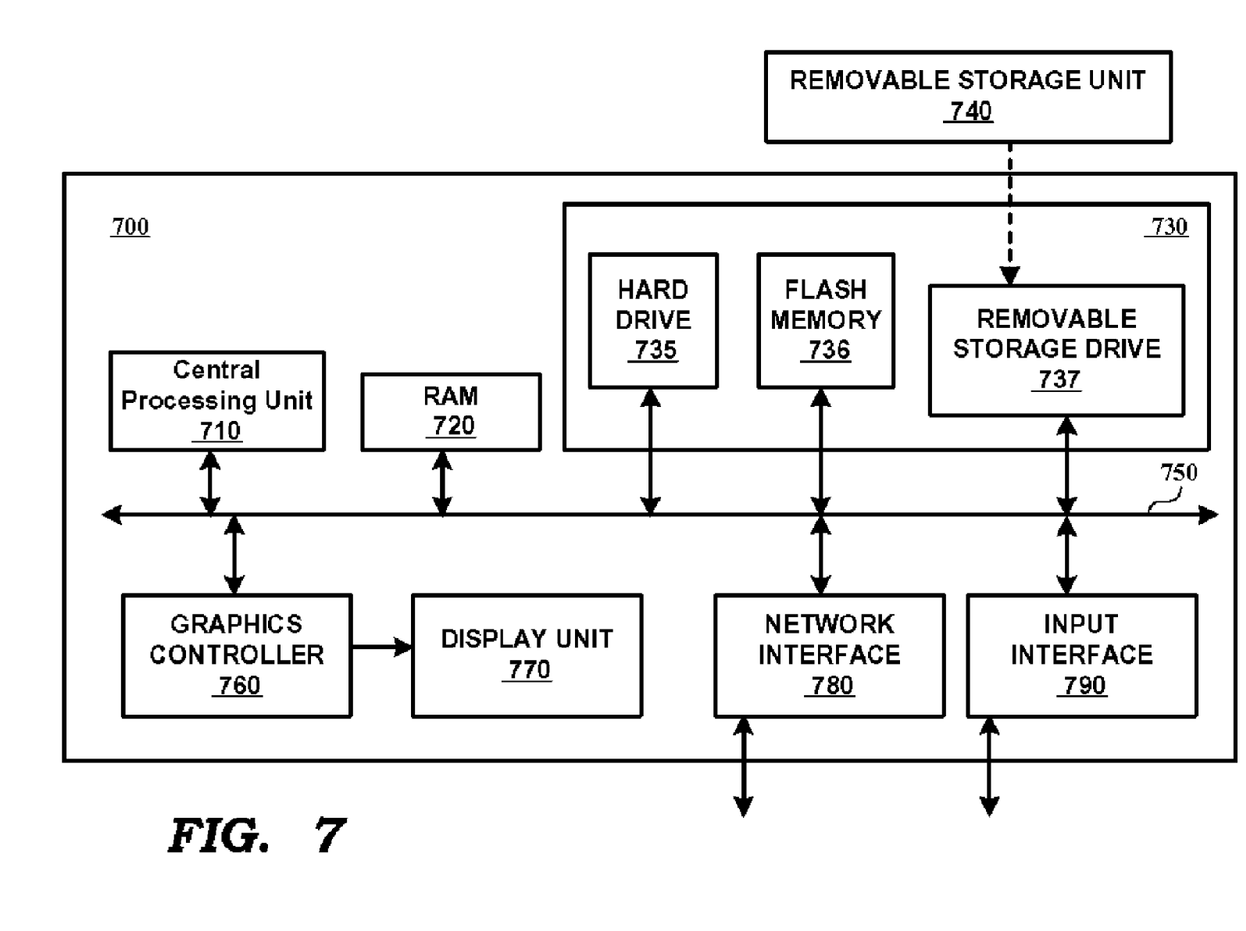
FIG. 7 is a block diagram illustrating the details of a digital processing system in which several features of the invention are operative upon execution of software instructions in one embodiment.

FIG. 7 is a block diagram illustrating the details of a digital processing system in one embodiment. Digital processing system 700 may correspond to application server 150 (or other system implementing the tiers noted above). Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions (e.g., of FIGS. 4A, 4B) stored in RAM 720 to provide several features of the present invention. CPU 710 may contain multiple processing units, with each processing unit potentially being designed for a specific task. Alternatively, CPU 710 may contain only a single general purpose processing unit. RAM 720 may receive instructions and data (e.g., tables of FIGS. 5A, 5B and/or 6) from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and/or mouse. Network interface 780 provides connectivity to a network (e.g., using Internet Protocol), and may be used to communicate with other systems (e.g., client systems 110-A to 110-C) of FIG. 1.

Secondary memory 730 may contain hard drive 735, flash memory 736 and removable storage drive 737. Secondary memory 730 may store the data (e.g., table of FIG. 5A/5B) and software instructions (e.g., portions of software module), which enable system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data.

In this document, the term "computer program product" is used to generally refer to removable storage unit 740 or hard disk installed in hard drive 735. These computer program products are means for providing software to system 700. CPU 710 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of correlating usage of a plurality of resources in a database tier to specific blocks of instructions executed in a multi tier application causing usage of said plurality of resources, wherein said database tier is contained in a plurality of tiers of said multi tier application and said database tier being implemented using a database server, said method comprising:

receiving a request requiring a database operation to be performed in said database tier;

executing a plurality of blocks of instructions in said plurality of tiers to process said request, said plurality of blocks including a sequence of blocks contained in said specific blocks of instructions;

forming a tag list containing a sequence of tags, wherein each of said sequence of blocks receives a partial tag list from a previous block in said sequence of blocks, adds a corresponding tag to the partial tag list to generate a modified tag list and provides the modified tag list as the partial tag list for the next block in said sequence of blocks, whereby said tag list is generated by the last one of said sequence of blocks, wherein each tag in said tag list identifies the corresponding block which has added the tag to said tag list;

executing said database operation on said database server in said database tier;

measuring resources used within said database server for said executing; and storing said tag list associated with said measured resources to thereby correlate the usage of resources within said database server to specific ones of said sequence of blocks.

2. The method of claim 1, wherein said tag list is provided as a variable representing a query context associated with said request.

3. The method of claim 1, wherein said measuring is performed prior to said executing said database operation.

4. The method of claim 1, wherein each of said sequence of tags are specified by a developer of said multi tier application, whereby said developer can include a desired tag in any desired block of instructions forming part of said multi tier application.

5. A computer readable storage medium carrying one or more sequences of instructions for causing correlation of usage of a plurality of resources in a database tier to specific blocks of instructions executed in a multi tier application causing usage of said plurality of resources, wherein said database tier is contained in a plurality of tiers of said multi tier application and said database tier being implemented using a database server, wherein execution of said one or more sequences of instructions by one or more processors causes said one or more processors to perform the actions of:

receiving a request requiring a database operation to be performed in said database tier;

executing a plurality of blocks of instructions in said plurality of tiers to process said request, said plurality of blocks including a sequence of blocks contained in said specific blocks of instructions;

forming a tag list containing a sequence of tags, wherein each of said sequence of blocks receives a partial tag list from a previous block in said sequence of blocks, adds a corresponding tag to the partial tag list to generate a modified tag list and provides the modified tag list as the partial tag list for the next block in said sequence of blocks, whereby said tag list is generated by the last one of said sequence of blocks, wherein each tag in said tag list identifies the corresponding block which has added the tag to said tag list;

executing said database operation on said database server in said database tier;

measuring resources used within said database server for said executing; and storing said tag list associated with said measured resources to thereby correlate the usage of resources within said database server to specific ones of said sequence of blocks.

6. The computer readable storage medium of claim 5, wherein said tag list is provided as a variable representing a query context associated with said request.

7. The computer readable storage medium of claim 5, wherein said measuring is performed prior to said executing said database operation.

8. The computer readable medium of claim 5, wherein each of said sequence of tags are specified by a developer of said multi tier application, whereby said developer can include a desired tag in any desired block of instructions forming part of said multi tier application.

9. An apparatus correlating usage of a plurality of resources in a database tier to specific blocks of instructions executed in a multi tier application causing usage of said plurality of resources, wherein said database tier is contained in a plurality of tiers of said multi tier application and said database tier being implemented using a database server, said apparatus comprising:

means for receiving a request requiring a database operation to be performed in said database tier;
   means for executing a plurality of blocks of instructions in said plurality of tiers to process said request, said plurality of blocks including a sequence of blocks contained in said specific blocks of instructions;
   means for forming a tag list containing a sequence of tags, wherein each of said sequence of blocks receives a partial tag list from a previous block in said sequence of blocks, adds a corresponding tag to the partial tag list to generate a modified tag list and provides the modified tag list as the partial tag list for the next block in said sequence of blocks, whereby said tag list is generated by the last one of said sequence of blocks,
   wherein each tag in said tag list identifies the corresponding block which has added the tag to said tag list;
   means for executing said database operation on said database server in said database tier;
   means for measuring resources used within said database server for said executing; and
   means for storing said tag list associated with said measured resources to thereby correlate the usage of resources within said database server to specific ones of said sequence of blocks.

10. The apparatus of claim 9, wherein said tag list is provided as a variable representing a query context associated with said request.

11. The apparatus of claim 9, wherein said means for measuring performs measurement prior to execution by said means for executing.

12. A computing system comprising:

an application server to execute a multi tier application comprising a plurality of tiers including a database tier, said multi tier application being configured to:
      receive a request requiring a database operation to be performed in said database tier;
      execute a plurality of blocks of instructions in said plurality of tiers to process said request, said plurality of blocks including a sequence of blocks of interest;
      form a tag list containing a sequence of tags, wherein each of said sequence of blocks receives a partial tag list from a previous block in said sequence of blocks, adds a corresponding tag to the partial tag list to generate a modified tag list and provides the modified tag list as the partial tag list for the next block in said sequence of blocks, whereby said tag list is generated by the last one of said sequence of blocks,
      wherein each tag in said tag list identifies the corresponding block which has added the tag to said tag list; and
      send said database operation to said database tier for execution, wherein said tag list is also sent with said database operation;
   a database server to implement said database tier and to store data in the form of tables, said database server being configured to:
      receive said database operation and said tag list;
      execute said database operation on said tables, wherein execution of said database operation causes a plurality of resources to be used within said database server;
      measure each of said plurality of resources used within said database server for executing said database operation; and
      store said measured resources associated with said tag list,
   whereby a user is enabled to correlate said measured resources used within said database server to specific ones of said sequence of blocks of interest executed in said multi tier application.

13. The computing system of claim 12, further comprising:
   a client system to enable said user to send said request to said multi tier application executing on said application server; and
   a query monitor to enable said user to retrieve said measured resources and associated tag list to enable correlation of resources used within said database tier to specific blocks of instructions executed in said multi tier application.

14. The computing system of claim 12, wherein said database operation comprises a structured query language (SQL) query, wherein said application server sends said SQL query to said database server for execution,
   wherein said measured resources represent resources used in said database server for executing said SQL query.

15. The computing system of claim 14, wherein said database server comprises a processor, a volatile memory and a persistent storage,
   wherein said measured resources comprise a measure of time of said processor, a number of times a buffer in said volatile memory was accessed, a number of times said persistent storage was accessed, and a number of bytes accessed from said persistent storage for execution of said SQL query in said database server.

16. The computing system of claim 15, wherein said measuring is performed prior to said executing said database operation.

17. The computing system of claim 12, wherein each of said sequence of tags are specified by a developer of said multi tier application, whereby said developer can include a desired tag in any desired block of instructions forming part of said multi tier application.

18. A method of correlating usage of a plurality of resources to specific blocks of instructions executed in a multi tier application causing usage of said plurality of resources, said method comprising:

receiving a request requiring processing in a plurality of tiers of said multi tier application;
   executing a plurality of blocks of instructions in said plurality of tiers to process said request, said plurality of blocks including a sequence of blocks contained in said specific blocks of instructions;
   forming a tag list containing a sequence of tags, wherein each of said sequence of blocks receives a partial tag list from a previous block in said sequence of blocks, adds a corresponding tag to the partial tag list to generate a modified tag list and provides the modified tag list as the partial tag list for the next block in said sequence of blocks, whereby said tag list is generated by the last one of said sequence of blocks,
   wherein each tag in said tag list identifies the corresponding block which has added the tag to said tag list;
   measuring resources for processing said request in said plurality of tiers; and
   storing said tag list associated with said measured resources to thereby correlate the usage of resources to specific ones of said sequence of blocks.

* * * * *

UNITED STATES PATENT AND TRADEMARK OFFICE
CERTIFICATE OF CORRECTION

PATENT NO.         : 7,610,293 B2                                         Page 1 of 1
APPLICATION NO.    : 11/566240
DATED              : October 27, 2009
INVENTOR(S)        : Venkata Naga Ravikiran Vedula It is certified that error appears in the above-identified patent and that said Letters Patent is hereby corrected as shown below:

In column 4, line 49, delete "them selves" and insert -- themselves --, therefor.

In column 4, line 59, delete "price table" and insert -- price_table --, therefor.

In column 7, line 26, delete "price table" and insert -- price_table --, therefor.

Signed and Sealed this

Third Day of August, 2010

David J. Kappos
*Director of the United States Patent and Trademark Office*